May 22, 1956 T. M. DEAKIN 2,746,152
DRAWING APPARATUS
Filed Feb. 1, 1952 4 Sheets-Sheet 4
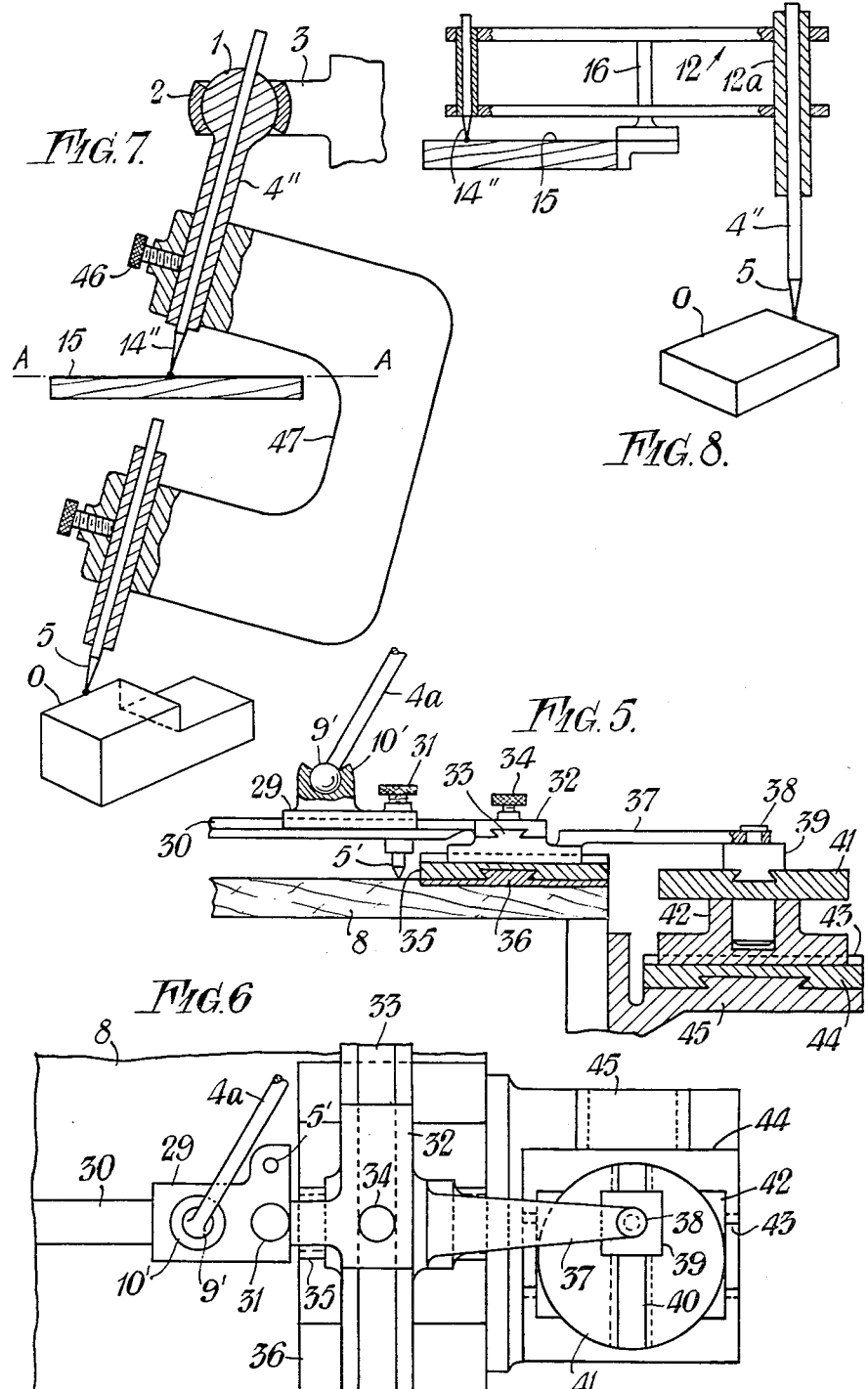

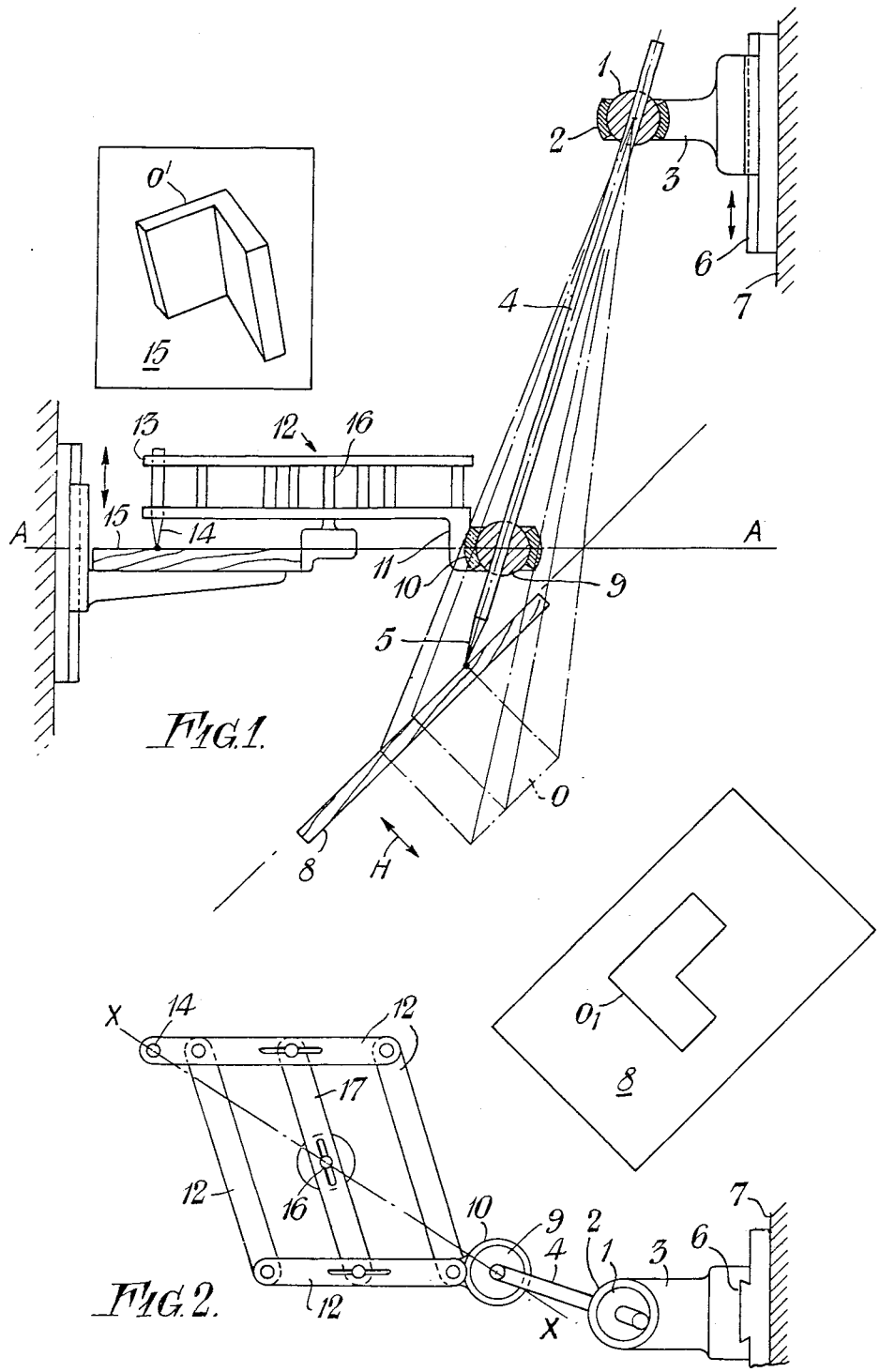

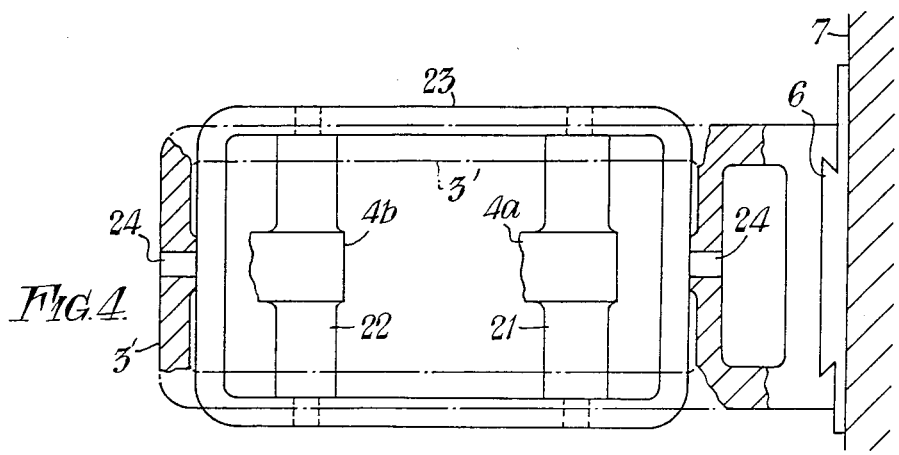

United States Patent Office 2,746,152
Patented May 22, 1956

2,746,152

DRAWING APPARATUS

Thomas Meyrick Deakin, London, England

Application February 1, 1952, Serial No. 269,481

Claims priority, application Great Britain February 2, 1951

8 Claims. (Cl. 33—18)

This invention concerns drawing apparatus and has for one of its objects to provide apparatus of a relatively simple nature for producing a true perspective drawing from a solid object or from a plan or elevation view thereof. Another object is to provide an apparatus for directly producing an isometric drawing of an object or a plan or elevation view.

Drawing apparatus according to the present invention comprises a rigid tracing member for following the contours of the object or drawing of which a perspective drawing is to be made, a drawing point movable over the drawing plane, and means for connecting the tracing member to the drawing point in such a way as to permit relative sliding movement of the latter with respect to the drawing plane in a direction generally normal thereto.

Preferably, the rigid tracing member is slidably mounted near one end in the ball of a ball and socket type pivot, and means is provided for supporting the socket at the viewing point for a true perspective drawing.

Alternatively, where the apparatus is designed to produce an isometric view, the drawing point is mounted in a rigid support which is constrained to move in a plane parallel to the drawing plane, and the tracing member is slidably mounted in a bearing on the drawing point support so as to remain at all times normal to the drawing plane.

Advantageously, the drawing point is carried by a pantograph linkage which is connected to the tracing member.

Various embodiments of the invention will now be described by way of example only with reference to the accompanying drawings in which:

Fig. 1 is a side elevation, partly in section, of a first embodiment of the invention showing a plan view of an article and the resultant perspective drawing;

Fig. 2 is a plan view of the apparatus shown in Figure 1 but with the tracing and drawing surfaces omitted;

Fig. 4 is a fragmentary section on the line IV—IV of Figure 3;

Fig. 5 is a fragmentary elevation, partly in section, of an attachment for the apparatus shown in Figures 3 and 4;

Fig. 6 is a plan view of the attachment illustrated in Figure 5;

Fig. 7 is an elevation, partly in section, of a simplified apparatus for producing perspective drawings, and Fig. 8 is an elevation of a simplified form of apparatus for producing isometric drawings.

Throughout the drawings like parts carry similar reference numerals.

Figure 3:
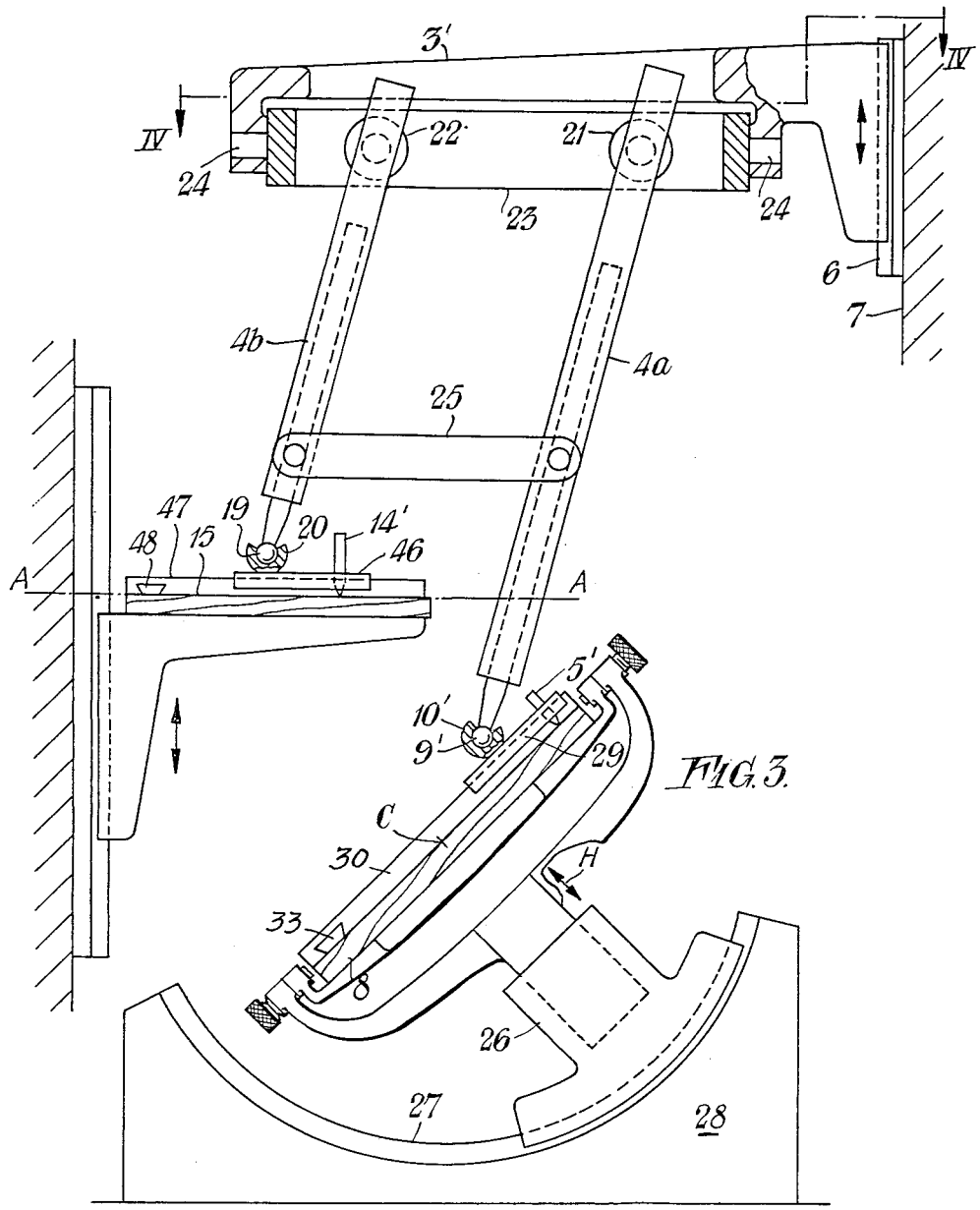
Fig. 3 is a view similar to Figure 1 of a modified form of the invention.

Figs. 1 and 2 show an embodiment of the invention which is designed for producing true perspective drawings. A ball and socket swivel joint or pivot 1, 2 is mounted in a bracket 3 at a point vertically above the drawing plane A—A to represent the viewing point of the object O to be drawn. The ball 1 is provided with a through bore to accommodate as a sliding fit a tracing rod or bar 4 whose free end carries a suitable tracing point 5 for following the outline of the object or view from which the perspective drawing (indicated at O') is to be made. The tracing rod or bar 4 is of a length such that the tracing point 5 can traverse the entire contour without disengagement of the bar 4 from the ball 1 at the viewing point. The bracket 3 is vertically adjustable on a guideway 6 on a frame member 7 of the apparatus.

The object O to be drawn in perspective is shown in Fig. 1 as represented by a drawing in plan indicated at $O_1$, of a body the boundaries of which outside the plane of the drawing are indicated by chain-dotted lines. The plan view $O_1$ is drawn on a board or table 8 which is displaceable bodily through a distance corresponding to the height of the article, as indicated by the arrow H, and is universally mounted in the frame of the apparatus so as to be capable of assuming any desired inclination with respect to a sight line passing through the viewing point and a selected point on the object O or drawing $O_1$. This point can be arbitrarily selected, and the viewing axis would customarily be normal or substantially normal to the drawing plane A—A.

The term "viewing axis" in this specification means the axis through the viewing point along which a chosen datum point on the object is observed when the latter is oriented in the position relative to the viewing point, from which the perspective drawing is to be made. Normally the viewing axis will be normal to, or make a large angle with, the drawing plane A—A on which the perspective view is to be developed, although this is not a rigid requirement for the operation of the apparatus.

Between the ball and socket pivot 1, 2 and the tracing point 5, the tracing rod or bar passes through the ball 9 of a second ball and socket swivel connection 9, 10 which is carried by a tail-piece 11 of a pantograph linkage 12. The pantograph is arranged to rest on the drawing plane A—A with its own plane parallel thereto. At the diametrically opposite corner 13, the pantograph carries a drawing point or stylus 14 which is free to move over the drawing surface 15 under the control of the pantograph linkage 12. The said linkage is also provided with an adjustable pivot point 16 which is slidable on a connecting bar 17 extending between one pair of opposite sides of the pantograph linkage and parallel to the other pair of sides. The connecting bar 17 is itself adjustable lengthwise of the said other pair of sides, the arrangement being such that the scale of the perspective drawing can be varied by adjustment of the position of the pivot point 16 along a straight line X—X (Fig. 2) drawn through the drawing point 14 and the ball and socket articulated connection 9, 10 between the pantograph 12 and the tracing rod or bar 4.

In use, the apparatus is set so that the ball and socket pivot 1, 2 is at the desired viewing point with respect to the object O, and the tracing table 8 is at the desired inclination to a line of sight passing through the viewing point and a specified point on the object O or drawing $O_1$. The tracing point 5 is moved around the contours of the object O, or a drawing $O_1$ thereof, in such a way that the mean position of the tracing bar 4 is substantially normal to the drawing plane A—A. The drawing point 14 carried by the pantograph 12 then traces a true perspective view O' of the object traced.

In the form of apparatus illustrated in Figures 3 and 4, the tracing point 5' and the drawing point 14' are connected by universal joints 9', 10' and 19, 20 respectively to separate bars 4a, 4b. These bars 4a, 4b are of telescopic construction and form opposite sides of a parallel link assembly. Their upper ends are pivoted on pins 21, 22 respectively which are carried in a rectangular cage 23. This frame 23 is mounted by trunnions 24 in a rigid bracket 3' capable of vertical displacement on a slide 6 secured to the pillar or like frame part 7. The trunnions 24 are co-axial and their axis is parallel to the drawing plane A—A. The pins 21, 22 and the trunnions 24 thus provide the same degree of freedom of angular displacement of the bars 4a, 4b as does the ball joint 1, 2 for the bar 4 in Figs. 1 and 2. The two bars 4a, 4b are coupled by a link 25 which lies parallel to the common axis of the trunnions 24.

The table 8 carrying a drawing or object of which a perspective view is required is universally mounted on a pedestal 26 which is supported on an arcuate slide 27 on a base 28. The arcuate slide 27 is struck about a centre C in the vertical plane which also contains the axis of the bars 4a, 4b and the trunnions 24. The table 8 is also axially adjustable in the pedestal 26 as indicated by the arrow H. The tracing point 5′ is mounted in a slide or saddle 29 which is guided over the surface of the table 8 by means of a compound slide assembly represented schematically in Fig. 3 by straight edges or guides 30, 33, and in greater detail in Figs. 5 and 6, with reference to which the assembly is more fully described below.

The drawing point 14′ is mounted in a saddle 46 similar to the slide 29 which carries the tracing point 5′. This saddle 46 is slidable on a straightedge 47 which is mounted on a transverse slide 48 at its end. The slide 48 is secured to the drawing surface 15.

The operation of this form of the apparatus is identical in principle to that of the apparatus shown in Figures 1 and 2 in that components of displacement of the tracing point 5′ in the direction of the axis of the trunnions 24 are transmitted to the drawing point 14′ through the link 25, whilst components of displacement of the tracing point 5′ transversely to the direction of the axis of the trunnions 24 is transmitted to the drawing point 14′ by tilting of the cage 23 on its trunnions. Furthermore, since the table 8 is universally mounted, a perspective drawing in any desired plane may be produced from a plan view of the object, the adjustability of the table 8 in the direction H permitting the necessary component of depth of the object to be reproduced at the drawing point 14′.

The control of the table 8 may be manual, although it will normally be preferable to arrange that displacement thereof in the direction of the arrows H be effected by some form of power operation, for example, by means of hydraulic or electric servomotors. In order further to facilitate the movement of the table 8 to reproduce the components of depth of the object to be drawn when the latter is represented solely by plan and elevation views, a vertical board (not shown) carrying the elevation view may be clamped to the pedestal 26 and a further tracing point (also not shown) may be fixed to the table 8 so as to follow contours in the vertical plane.

Figures 5 and 6 show an attachment for facilitating the following by the tracing point 5′ of circles or arcs of relatively sharp radius. The socket part 10′ of the ball and socket joint 9′, 10′ is mounted on a slide 29. The slide 29 carries the tracing point 5′ as noted above, and is movable along a straightedge guide 30 which spans the tracing surface on the board 8. A clamping screw 31 is provided for locking the slide 29 to the straightedge 30 when it is required to trace a circle or a circular arc. Each end of the straightedge 30 is provided with an integral transverse slipper 32 which is movable on a rectilinear guideway 33 extending at right angles to the straightedge 30. A clamping screw 34 is mounted on the slipper 32 for clamping the straightedge 30 to the guideway 33 when tracing a circle or a circular arc.

The guideway 33 is itself mounted on a short intermediate slide 35 for displacement in the direction of length of the straightedge 30, and this intermediate slide is in turn slidably mounted on a lower fixed guideway 36 extending for a short distance parallel to the guideway 33. The arrangement of intermediate slide 35 and lower guideway 36 allows the straightedge guide 30 and the guideway 33, when the two are clamped together, to be displaced for short distances in two directions at right angles, and thus provides the necessary freedom of movement of the straightedge 30 when tracing a circular arc. The straightedge 30 and guideway 33 constitute the main guides for the tracing point 5 during ordinary use, while the slide 35 and lower guideway 36 constitute subsidiary guides for the tracing point 5′ when following a circular arc.

The guide way 33 is provided with an integral lateral extension arm 37 having its outer end anchored on a pivot pin 38 carried in an adjustable slide block 39. This slide block 39 is displaceable in a groove 40 formed in the upper surface of a disc 41 which is pivotally mounted in a bearing block 42. The base of the latter works in a short guideway 43 formed in a direction parallel to the straightedge 30 in a plate 44, whilst the plate 44 is in turn mounted for limited linear displacement parallel to the guideway 33 on a bracket 45 secured to the table 8. The position of the bearing block 42 along its guideway 43, and the position of the plate 44 relative to the bracket 45 may be selectively fixed in any preferred manner.

When a circle or circular arc of short radius is to be traced by the point 5′, the saddle 29 is clamped to the straightedge 30 by the screw 31 and the straightedge 30 is clamped to the guideway 33 by the screw 34. The axis of the disc 41 is suitably positioned by means of its two-directional slide mounting 42, 44, and the slide block 39 is set in the guideway 40 so that the pin 38 is at the same distance from the centre of rotation of the disc 41 as the radius of the curve to be traced. The block 39 is then clamped in position, and the disc 41 is rotated through the desired angle. The compound slide mounting 35, 36 then guides the tracing point 5′ in a true arc of the same radius as the curve. The freedom of lateral displacement of the axis of rotation of the disc 41 and the compound slide mounting 35, 36 of the straightedge 30 enables a circle or circular arc to be traced at any position on the table 8.

Fig. 7 shows a simplified construction of true perspective drawing apparatus according to the invention. In this construction the drawing point 14″ is mounted in a tubular guide constituting the tracing bar 4″ for reciprocation axially relative to the bar. The drawing point 14″ moves over a drawing surface 15 and the tracing bar or rod 4″ is clamped by a knurled screw 46 to a yokepiece 47 which is cranked to clear the said surface, the tracing point 5 being located beneath and co-axially with it to move over the contours of the object O or plan view of which a perspective drawing is required.

If the viewing point is moved an infinite distance away, the tracing bar 4″ remains at all times parallel to a fixed direction which is conveniently normal to the drawing plane A—A. The perspective drawing then becomes an isometric projection. The universal pivot for the tracing bar 4″ then becomes virtual or imaginary, and only such length of the bar is used as will enable it physically to follow the contours in depth of the object to be drawn.

In order to produce an isometric projection of an object (see Fig. 8), the ball and socket pivot 1, 2 at the viewing point is dispensed with, and the tracing rod 4″ is guided in a through bore formed in the appropriate member 12a of the pantograph linkage 12, the arrangement being such that the tracing rod 4″ remains normal to the drawing plane A—A while the tracing point 5 follows the contours of the object O or plan view to be drawn. Such an arrangement is of more restricted application, since the size of the object O which can be traced is limited.

In a still further alternative arrangement (not shown), the tracing rod or bar 4 in any of the embodiments described above is replaced by a telescope which can be focussed on a large object such as a building, and moved to follow its outline in similar manner to the tracing bar. By this means, either a true perspective or an isometric projection can be obtained.

By means of apparatus according to the invention, perspective drawings can be made by relatively unskilled labour of apparatus or structures not yet built but of which plane sections or elevations have been drawn. For example, the general appearance and proportions of such objects as machine tools, ships, buildings and the like can be drawn from the working drawings or architects' plans. Such drawings, which have hitherto called for the exercise of great skill and the expenditure of much time, can be made both quickly and accurately. Furthermore, the proportions and layout of complicated installations such as industrial boiler installations or factory sites can be rapidly produced from the usual drawings or plans.

It is also envisaged that a plan or elevation of an object, for example a machine tool, building or the like, can be derived from a perspective view thereof—such as a photograph, provided that certain dimensions of the object, notably angles—are known or can be deduced beforehand. The method used would be to trace the perspective view with the drawing point 14 or 14' on a perspective view placed on the drawing surface 15 and to reproduce the plan or elevation with the tracing point 5, 5' on the table 8, the latter being set to an angle complementary to the viewing angle of the perspective drawing.

What I claim is:

1. Drawing apparatus comprising a plane drawing surface, a drawing point movable over said surface, a bracket located above and adjustable towards and away from the drawing surface, a universally adjustable table located below the drawing surface, a rigid frame mounted for rotation in the said bracket about an axis parallel to the drawing surface, a pair of transversely rigid telescopic members pivotally mounted in the frame about parallel axes which are perpendicular to the axis of rotation of the frame, a universal pivot connection between one of said telescopic members and the drawing point, a tracing point traversible over the surface of the universally adjustable table, a universal pivot connection between the other telescopic member and the tracing point, and a linkage interconnecting said telescopic members to keep their axes parallel and coplanar.

2. Drawing apparatus comprising a plane drawing surface, a drawing point movable over said drawing surface, mutually perpendicular guides extending parallel to said surface for guiding said drawing point in two directions at right angles to each other, a pivot mounting adjustably located above said plane, a transversely rigid telescopic tracing member universally pivoted at one end in said mounting, a second transversely rigid telescopic member universally pivoted at one end in said mounting at a point spaced from the pivot of the tracing member in a direction parallel to the drawing plane, a universal pivotal connection between the other end of said second telescopic member and said drawing point, and a linkage interconnecting the said telescopic members to maintain their axes parallel and coplanar.

3. Drawing apparatus comprising a plane drawing surface, a drawing point movable over said surface, a universally adjustable table for supporting the object to be traced, a tracing point traversible over the surface of the table, mutually perpendicular guides extending parallel to the surface of the table for guiding the tracing point in a direction having components parallel to the guides, telescopically adjustable rigid members universally pivotally connected respectively to the drawing point and the tracing point, a universal pivot mounting for each telescopically adjustable rigid member located in a common plane parallel to and located above the drawing surface, and a linkage for maintaining the axes of said telescopically adjustable rigid members at all times parallel to each other.

4. Drawing apparatus comprising a plane drawing surface, a drawing point movable over said surface, a universally adjustable table for supporting the object to be traced, a tracing point traversible over the surface of the table, mutually perpendicular main guides extending parallel to the surface of the table for guiding the tracing point, a pair of mutually perpendicular subsidiary guides also extending parallel to the surface of the table and constituting a mounting on said table for one of said main guides, a rigid lateral extension on one subsidiary guide, an adjustable throw crank device secured to the table for rotation in a plane parallel to the table surface and pivotally coupled to said rigid lateral extension, and a coupling between the tracing and drawing points for transmitting to the latter the components, measured on the drawing surface, of the motion of the former over the surface of the table.

5. Drawing apparatus as claimed in claim 4 wherein the main guides comprise a straightedge guide for slidably supporting the tracing point and itself slidably mounted on a guideway extending in a direction perpendicular to the said straightedge guide, and the subsidiary guides comprise a guideway fixed on the table and extending parallel to the first-mentioned guideway and an intermediate slide movable along said subsidiary guideway and having on its upper surface a transverse guide formation extending parallel to the straightedge guide, said first-mentioned guideway being slidable on said transverse guide formation.

6. Drawing apparatus as claimed in claim 5 in combination with a variable-throw crank rotatable in a plane parallel to the plane of the table and mounted for bodily traverse in a direction parallel to the subsidiary guideway fixed on the table, and a link rigid with said first-mentioned guideway and engageable with the crank pin of said variable-throw crank.

7. Drawing apparatus as claimed in claim 6 wherein the variable-throw crank comprises a disc pivotally supported in a bearing block for rotation about an axis normal to the plane of the table and having a crank pin adjustable radially of the disc, in combination with means for guiding the bearing block in a direction parallel to the subsidiary guideway and in a direction perpendicular thereto and parallel to the plane of rotation of the disc.

8. Drawing apparatus comprising a plane drawing surface, a transversely rigid telescopic tracing member, a universal pivot mounting for one end of said tracing member, a table for supporting the object to be traced and adjustable both angularly about mutually perpendicular axes parallel to the surface thereof and bodily toward and away from said surface, said table being displaceable in a direction normal to its surface during a drawing operation, a tracing point universally pivotally coupled to said telescopic tracing member and movable over said drawing surface, a second transversely rigid telescopic member universally pivoted at one end at a point spaced from the pivot of the tracing member in a direction parallel to the drawing plane, a universal pivotal connection between the other end of said second telescopic member and a drawing point, and a linkage interconnecting said telescopic members to maintain their axes parallel and coplanar.

References Cited in the file of this patent

UNITED STATES PATENTS

| | | |
|---|---|---|
| 190,797 | Ware | May 15, 1877 |
| 655,750 | Barr | Aug. 14, 1900 |
| 1,059,893 | Milde | Apr. 22, 1913 |
| 1,452,858 | Wetzer et al. | Apr. 24, 1923 |
| 1,627,205 | Seaborne | May 3, 1927 |
| 2,419,078 | Ivy | Apr. 15, 1947 |

FOREIGN PATENTS

| | | |
|---|---|---|
| 3,682 | Great Britain | 1868 |
| 17,733 | Switzerland | Oct. 3, 1898 |
| 366,995 | Germany | Jan. 15, 1923 |
| 19,736 | Holland | Apr. 15, 1929 |